Figure 1:
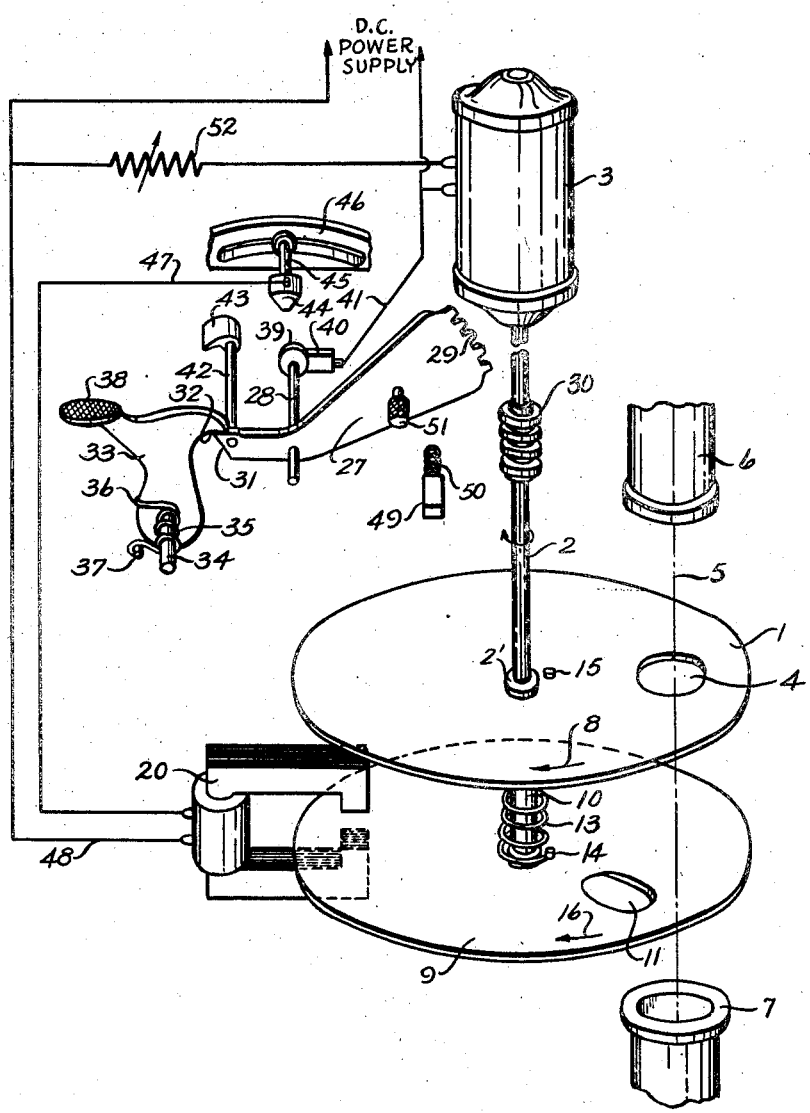

May 2, 1944. G. A. MAGNUS ET AL 2,347,699
CAMERA SHUTTER
Filed Feb. 16, 1942 3 Sheets-Sheet 1

INVENTORS
GEORGE A. MAGNUS
SAMUEL ARONOFF
BY
ATTORNEYS

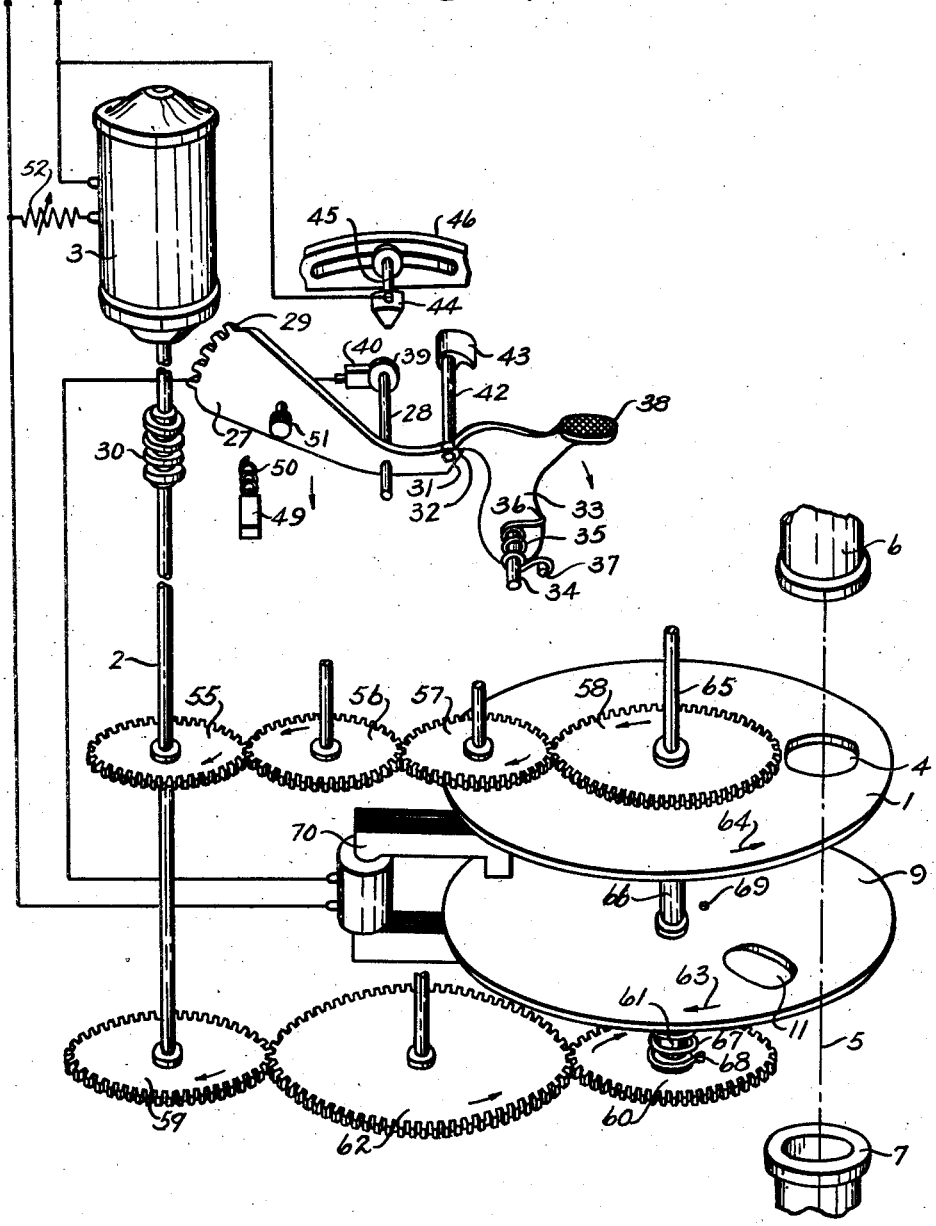

May 2, 1944.　　G. A. MAGNUS ET AL　　2,347,699
CAMERA SHUTTER
Filed Feb. 16, 1942　　3 Sheets-Sheet 3
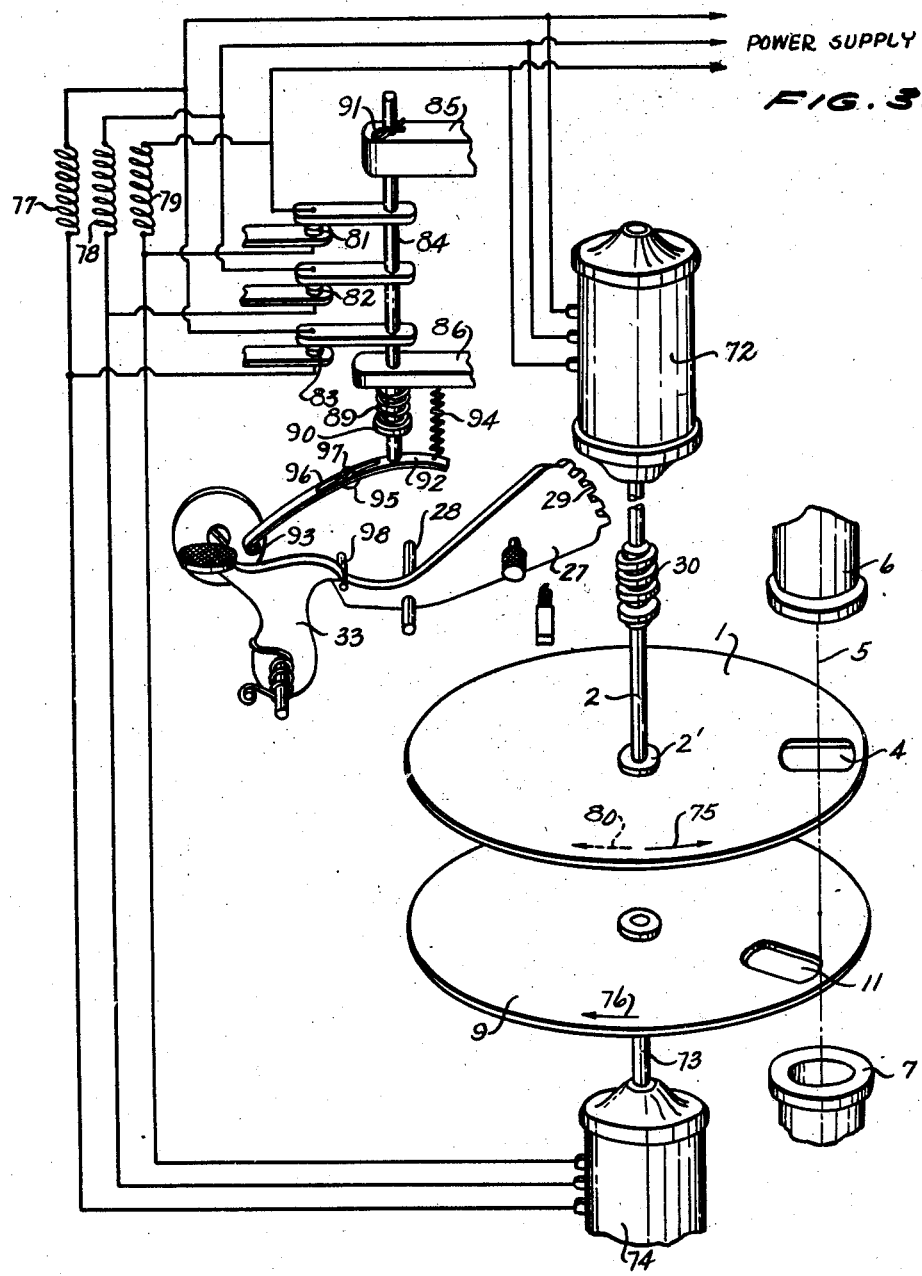
INVENTORS
GEORGE A. MAGNUS
SAMUEL ARONOFF Patented May 2, 1944

2,347,699

UNITED STATES PATENT OFFICE 2,347,699

CAMERA SHUTTER

George A. Magnus and Samuel Aronoff, Dayton, Ohio

Application February 16, 1942, Serial No. 431,079

21 Claims. (Cl. 95—53)

(Granted under the act of March 3, 1883, as amended April 30, 1928; 370 O. G. 757)

The invention described herein may be manufactured and used by or for Government for governmental purposes, without the payment to us of any royalty thereon.

This invention relates to improvements in camera shutters, and more particularly to those shutters which are suitable for use on large, high-speed cameras of the type used in aerial photography.

The present-day aerial cameras require large shutters capable of operating at high speeds and with great accuracy. It has been found very difficult to obtain such a shutter, this being mainly due to the fact that the moving parts are quite large and hence possess considerable inertia. The use of powerful springs for the purpose of overcoming this resistance to change in movement is not a satisfactory solution of the problem, due to the increased size of the parts required to withstand the strain imposed upon them by the heavier springs. Difficulty is also experienced in securing accurate exposure times with the conventional shutters because of variations in the strength of the springs which cause corresponding variations in the operating speed of the shutters. It is particularly important in the case of high-speed shutters that the shutter speeds be held within very close limits, since the shorter the exposure, the greater will be the error occasioned by a small variation in the time of exposure. For example, in a shutter operating at one one-thousandth of a second, a variation of one one-thousandth of a second in its speed of operation will result in a halving or a doubling of the exposure. This, of course, will result in an underexposed or an overexposed negative and may mean the loss of an extremely valuable negative which cannot be replaced.

With a view to overcoming these difficulties, we have devised a new type of shutter which does not depend upon springs for its source of motivation and in which the problem of inertia is no longer present. This is made possible through the use of a constantly rotating disk having an aperture which passes through the optical axis and uncovers the optical system for a brief instant on each revolution of the disk. In this manner it is possible to secure very accurately timed exposures so long as the disk rotates with a constant speed. A supplementary screening disk is employed for the purpose of keeping the system covered at all times except when an exposure is to be made. At such time, the screening disk is moved so as to uncover the system during the instant that it is uncovered by the rotating disk, after which the screening disk again covers the system so as to prevent a double exposure as the aperture in the disk comes around again. Thus, a very rapid and accurate exposure may be made in a camera of unlimited size by the use of our mechanism.

Accordingly, one of the objects of our invention is to provide a high-speed shutter suitable for use on large cameras of the type used in aerial photography. In so doing, we have devised a means for making very rapid exposures with extreme accuracy, the means employed being quite simple in nature and very reliable in operation.

Another object of our invention is to provide a high-speed shutter for cameras, in which the exposure is made by the uncovering of the optical system by an aperture located near the periphery of a rapidly rotating disk.

A further object of our invention is to provide a high-speed shutter for cameras, in which a screening disk is employed in conjunction with the rotating disk for the purpose of covering the optical system at all times except for the brief instant when an exposure is being made.

Still a further object of our invention is to provide a high-speed shutter for cameras, in which means is provided for synchronizing the movement of the screening disk with that of the rotating disk so that when an exposure is made, both will uncover the optical system at the same instant.

In general, our device is comprised of a rapidly rotating disk which has provided therein an aperture so located as to pass through the optical axis of the system on each rotation of the disk. In this manner it is possible to obtain very high exposure speeds and at the same time to secure a very high degree of accuracy in exposure times. In order to prevent an exposure's being made on each rotation of the disk as the aperture passes through the optical axis, a supplementary disk located beneath the main disk is rotated in synchronism with the main disk for the purpose of keeping the system covered at all times except when an exposure is to be made. This supplementary, or screening, disk contains an aperture similar to the aperture in the main disk, but normally out of line therewith except at such times as an exposure is to be made. At this time the supplementary disk is moved relative to the main disk so as to bring the aperture in the former into line with that in the latter, whereby a momentary beam of light may pass through the system and make the exposure. The means for shifting the supplementary disk so as to bring its aperture into line with the one in the main disk is synchronized with the movement of the main disk so that this shifting takes place at the time when the aperture in the main disk is about to pass through the optical axis, the supplementary disk being allowed to return to its normal position before the apertures pass through the optical axis for the second time, thus preventing a double exposure of the film.

In the drawings are shown three different embodiments of our invention, all of which operate in the general manner set out above; and it is evident that other methods of securing the results could be readily devised in the light of our teaching. It is to be understood, therefore, that our invention is not limited to the particular structures herein shown, but that the scope thereof is rather to be determined by the breadth of the appended claims.

In the drawings:

Fig. 1 is a perspective view of one embodiment of our invention, in which both the main shutter disk and the supplementary screening disk are driven in the same direction and by the same motor. The supplementary disk is located below the main disk and is flexibly driven by means of a torsion spring connecting the two disks, an electromagnet being provided for the purpose of imposing a drag on the supplementary disk at the proper moment so as to cause the apertures in the two disks to pass through the optical axis at the same instant and thus cause an exposure to be taken.

Fig. 2 is a perspective view of another embodiment of our invention, in which both disks are again driven by a single motor, the supplementary disk, however, being driven in a reverse direction from that of the main disk by means of suitable gearing. In this manner it is possible to obtain still higher exposure speeds than by the method shown in Fig. 1.

Fig. 3 is a perspective view showing a further embodiment of our invention, in which the main shutter disk and the supplementary screening disk are driven by two separate synchronous motors. The position of the supplementary disk is changed with respect to that of the main disk, at the time when an exposure is to be made, by means of inductances imposed in the line of the motor driving the supplementary disk so as to change its phase relationship with the motor driving the main disk.

In the embodiment shown in Fig. 1 of the drawings, a main shutter disk 1 is seated against and rigidly secured to a flange 2' formed on a shaft 2. This shaft is preferably rotated with constant speed in a clockwise direction by a small, direct-current motor 3. The disk is provided with an aperture 4 so located therein as to pass through the optical axis 5 of an optical system formed by the lenses 6 and 7 on each rotation of the disk. Thus the aperture in the disk will pass through the optical axis from right to left, or in the direction of the arrow 8, on each revolution of the disk. Situated below the disk 1 is a supplementary screening disk 9 rigidly attached to a sleeve 10, this sleeve being rotatably mounted on the lower end of the shaft 2. Disk 9 is provided with an aperture 11 which normally lies out of line with the optical axis 5 when the aperture 4 in the disk 1 is passing therethrough as shown in the figure. The disk 9 is flexibly driven by the disk 1 by means of a torsion spring 13 encircling the sleeve 10, the lower end of the spring being fastened to the disk 9 at 14, and the upper end thereof being fastened to the disk 1 at 15. Hence it will be seen that the disk 9 will be flexibly driven in a clockwise direction, or in the direction of the arrow 16, by means of the spring 13.

An electromagnet 20 is provided for the purpose of imposing a drag on screening disk 9 whenever an exposure is to be made, thus causing the spring 13 to be flexed as the disk 1 moves ahead of the disk 9. As shown in the figure, the electromagnet has its pole pieces disposed on opposite sides of the screening disk so as to produce Foucault currents in the disk when the magnet is energized. The energization of this magnet is controlled by a synchronizing device shown in the upper left-hand portion of the figure. This device is comprised of a sector 27 pivoted for rotation on the shaft 28 and having gear teeth 29 which are adapted to engage with the single thread of the worm 30 rigidly attached to the shaft 2. The left-hand end of the sector is provided with a nose 31 engaging under the shoulder 32 of a latch 33. This latch is pivotally mounted on the shaft 34 and is normally urged in a clockwise direction by means of a torsion spring 35 wrapped around the shaft 34 and having one end anchored to the latch at 36, the other end being anchored to a pin 37 fixed in the framework of the shutter. A thumb plate 38 is provided on the latch so that the operator may, by pressing down on the thumb plate, rotate the latch in a counterclockwise direction so as to remove the shoulder 32 from over the nose 31 on the sector and allow the latter to drop by virtue of its own weight until the gear teeth 29 thereon engage with the thread on the worm 30. As the worm 30 rotates, the sector will be fed downwardly and, at a predetermined point in its travel through the worm, the sector will cause the circuit containing the electromagnet to be closed, thus causing the apertures 4 and 11 to pass through the optical axis at the same instant. Toward this end, the sector 27 carries a rod 42, on the outer end of which is fixed a brush 43. This brush is adapted to engage a contact block 44 fastened to one end of a short rod 45, the other end of which is slidably mounted in a slot provided in a sector 46, whereby the contact block 44 may be adjusted back and forth so as to alter the time of contact of the brush 43 therewith. A slip ring 39 is provided on the shaft 28, a brush 40 being adapted to bear against this slip ring for the purpose of connecting one side of the power supply 41 to the sector and to brush 43. A conductor 47 connects the contact block 44 with one side of the electromagnet 20, the other side of the electromagnet being connected by conductor 48 to the other side of the power supply. Hence, when the brush 43 makes contact with the block 44, the magnet 20 will be energized so as to reduce the speed of the disk 9 and change its position relative to the disk 1.

In order that the shutter speed may be varied as desired, a rheostat 52 is placed in the motor circuit for the purpose of controlling the speed of the motor 3 and thereby also the speed of the disks 1 and 9.

The operation of this shutter is as follows:

With the motor 3 operating to constantly rotate the worm 30 and the disk 1 in a clockwise direction, the shutter may be operated to effect an exposure of the film in the camera by manipulating the latch 33 to release the sector 27. The sector will then drop into engagement with the worm 30 and be carried through the worm as the latter rotates. At a predetermined point in the travel of the sector through the worm, the brush 43 will make contact with the block 44 to thereby energize the electromagnet 20 and thus change the position of the disk 9 to such an extent that the aperture 11 therein will pass through the optical axis at the same time as the aperture 4 in the disk 1. The contact block 44 is adjusted along the sector 46 to such a point that contact will be made and the electromagnet energized at the proper instant to cause the apertures to be aligned as they pass through the optical axis. The contact made by the brush 43 with the block 44 is of short duration so that by the time the apertures come around for the second time the circuit through the magnet 20 will have been broken and the spring 13 will have restored the disk 9 to its normal position, where it serves to screen the optical system as the aperture 4 passes through the optical axis. Thus, although the disk 1 is constantly rotating and will uncover the optical system at frequent intervals, an exposure can be made only when the latch 33 is manipulated and the action of the screening disk will ensure that only a single exposure is made.

After the exposure has been made and the sector 27 has passed through the worm 30, it will fall against and be supported by a block 49 held in position by a compression spring 50. In order to reset the sector 27, the operator grasps the thumb knob 51 on the sector and, after pushing in the block 49 against the force of the spring 50, he swings the sector around in a clockwise direction until the nose 31 is again latched beneath the shoulder 32. The sector 27 is slightly bent at the point where it is pivotally mounted on the shaft 28 so that the right-hand end of the sector will not strike against the latch 33 and it is being swung around into its original position.

In Fig. 2 of the drawings is shown another embodiment of our invention, in which the main shutter disk 1 and the supplementary screening disk 9 are driven in opposite directions by the motor 3 through the use of suitable gearing interposed between these disks and the drive shaft 2. The main disk 1 is driven by a gear 55 fast on the shaft 2, which gear meshes with idlers 56 and 57 so as to drive a gear 58, rigidly secured to the disk 1, in a counterclockwise direction. The supplementary disk 9 is driven by a gear 59, fast on the lower end of the shaft 2, which drives a gear 60 fastened to the lower end of a sleeve 61 by means of a single idler gear 62. Thus the disk 9 will be driven in a clockwise direction, or in the direction of the arrow 63, while the disk 1 will be driven in the opposite direction, or in the direction of the arrow 64. The disk 1 is freely mounted for rotation on the shaft 65, and the disk 9 is attached to the lower end of a sleeve 66 which is free to rotate on shaft 65. The sleeve 61, on which is fastened the gear 60, is freely rotatable on the lower end of the sleeve 66, whereby the disks 1 and 9 and the gear 60 are all free to rotate independently with respect to shaft 65. The disk 9, however, is flexibly connected to the gear 60 by means of a torsion spring 67 which encircles the sleeve 61, the lower end of the spring being attached to the gear at 68, while the upper end of the spring is attached to the disk 9 at 69. Thus the disk 9 is flexibly driven by the motor 3 in a direction opposite to that of the disk 1, and its position relative to the latter disk may be altered by energization of the electromagnet 70 in the same manner as the modification shown in Fig. 1. The means for synchronizing the time of energization of the magnet 70 with the rotation of the disk 1 is the same as that shown in the former modification—that is, the latch 33 is manipulated to release the sector 27 to permit it to fall into engagement with and feed through the worm 30, thus causing the brush 43 to make contact with the block 44 at an instant just prior to the time when the aperture 4 passes through the optical axis 5 of the lens system 6 and 7. In this manner the electromagnet 70 will be energized at the proper time to reduce the speed of the disk 9 so as to cause the aperture 11 therein to occupy a position directly in line with the optical axis at the same time that the aperture 4 in disk 1 occupies a similar position. Thus the two apertures will pass through the optical axis at the same instant and an exposure will be taken. Since the apertures are traveling in opposite directions, the shutter speed will be approximately twice that of the shutter shown in Fig. 1, assuming, of course, that the motor 3 is running at the same speed in each case. Inasmuch as the contact between the brush 43 and the block 44 is of short duration, the electromagnet will be deenergized immediately after the apertures have passed through the optical axis, and the spring 67 will restore the supplementary screening disk 9 to its original position before the apertures reach the optical axis on the next rotation. Hence the apertures will again be out of line so that there will be no possibility of a double exposure's taking place.

Here again, a rheostat 52 is provided in the circuit of motor 3 in order that the speed of rotation of the disks 1 and 9 may be suitably controlled.

A somewhat different form of structure is utilized in the embodiment shown in Fig. 3 for the purpose of carrying out our invention. As shown in this figure, the main shutter disk 1 is fastened to a shaft 2 driven by a synchronous motor 72. The supplementary screening disk 9 is fast on a shaft 73 driven by a second synchronous motor 74. The motors 72 and 74 preferably drive disks 1 and 9 in opposite directions as shown by the arrows 75 and 76, respectively. If desired, however, the disk 1 may be driven in the same direction as the disk 9, as indicated by the dotted arrow 80. Here, as in the previous two modifications, the aperture 11 in the supplementary screening disk passes through the optical axis ahead of the aperture 4 in the main disk 1. In order to change the position of the disk 9 relative to the disk 1 at the time when an exposure is to be made, a series of inductances 77, 78, and 79 is arranged to be inserted in the line of the motor 74 so as to change its phase with respect to the motor 72. To this end, a set of contacts 81, 82, and 83 is provided which normally shunts out the inductances 77 to 79 so that the motors will operate together, with the aperture 11 leading the aperture 4 as shown. The lower half of each of the contacts 81, 82, and 83 is rigidly mounted in the framework of the shutter, while the upper halves of these contacts are carried by arms rigidly secured to a rod 84 slidable in the supports 85 and 86. A compression spring 89 encircles the lower end of the rod 84, the upper end of this spring pressing against the support 86, while the lower end thereof presses against a collar 90 secured to the rod 84. The rod is thus urged in a downward direction by the spring, this movement being limited by a pin, or cotter key, 91 adapted to contact the upper surface of the support 85. A cam member 92 is pivotally mounted at 93 and is held in contact with the lower end of the rod 84 by means of a light spring 94 extending between the end of the member 92 and the support 86. The member 92 is provided with a slot 96 in which a cam block 95 is slidably mounted for movement along the length of slot 46. A screw

driven in phased relation to each other, each of said disks having an aperture therein positioned so as to pass through the optical axis of said optical system on each revolution, said apertures being normally out of registry with each other, one of said disks having a lost-motion connection so as to be displaceable relative to the other to the extent required to bring said apertures in registry, and means for displacing said one disk so as to cause said apertures to come into registry at the time they pass through the optical axis.

5. In a shutter for controlling the passage of light through the optical system of a camera, the combination of a rotating disk having an apertures therein for enabling the passage of light through the system, a screening member for normally preventing the passage of light through said system, a driving element operating in synchronism with said rotating disk, a driven element selectively engageable with said driving element and operable in a predetermined position of the latter to actuate said screening member to uncover the optical system at the time when said aperture is passing through the optical axis of said camera, and means for varying the position of said driving element at which said driven element is operable to actuate said screening member.

6. In a shutter for controlling the passage of light through the optical system of a camera, the combination of a rotating screen lying in the path of the light passing through the system and having an aperture which passes through the optical axis of the system on each rotation of the screen, a second rotating screen also lying in the path of the light passing through the system and having an aperture which passes throught the optical axis on each rotation thereof, said second screen being rotated in phased relationship with respect to said first screen so that the apertures in the two screens pass through the optical axis at different times, a driving member moving in synchronism with said shutter, a driven element selectively engageable with said driving member, and means actuated by said element in a predetermined position of said driving member for varying the speed of rotation of said second screen at the proper moment to cause the aperture therein to pass through the optical axis at the time when the aperture in said first screen passes therethrough.

7. In a shutter for controlling the passage of light through the optical system of a camera, the combination of a rotating shaft, a disk rigidly mounted on said shaft, said disk lying in the path of the light passing through the system and having an aperture which passes through the optical axis of the system on each rotation of the disk, a second rotating disk also lying in the path of the light passing through the system and having an aperture which passes through the optical axis on each rotation thereof, said second disk being rotated in phased relationship with respect to said first disk so that the aperture therein passes through the optical axis slightly ahead of the aperture in said first disk, a worm on said shaft, a toothed sector selectively engageable with said worm, and means actuated by said sector in a predetermined position of said worm for reducing the speed of rotation of said second disk at the proper moment to cause the aperture therein to pass through the optical axis at the time when the aperture in said first disk passes therethrough.

8. In a shutter for controlling the passage of light through the optical system of a camera, the combination of an electric circuit, a rotating disk lying in the path of light passing through the system, said disk having an aperture which passes through the optical axis of the system with each rotation of the disk, an electric motor in said circuit for driving said disk, a screening member likewise lying in the path of the light passing through the system for normally preventing the passage of light therethrough, means for moving said screening member, electrical means connected in said circuit for controlling the movement of said screening member, and electric contact means operable in accordance with the movement of said disk for closing said electric circuit to said electrical means at the proper moment to cause said screening member to uncover the optical system at the time when said aperture is passing through the optical axis of said camera.

9. The invention as defined in claim 8, in which said electrical contact means are adjustable for varying the time at which said screening member uncovers the optical axis of said camera in relation to the movement of said disk.

10. The invention as defined in claim 8, in which the electric motor is of the constant-speed type and in which there is further provided variable-resistance means in the electrical circuit to said motor for varying the speed of rotation of said disk.

11. In a shutter for controlling the passage of light through the optical system of a camera, the combination of a rotating screen lying in the path of the light passing through the system and having an aperture which passes through the optical axis of the system on each rotation of the screen, a second screen flexibly driven in synchronism with said first screen and having an aperture which passes through the optical axis on each rotation thereof, the aperture in said second screen being displaced with respect to the aperture in said first screen so that the apertures in the two screens pass through the optical axis at different times, and means operable in accordance with the movement of said first screen for changing the position of said second screen relative to said first screen so as to cause the apertures in the two screens to pass through the optical axis at the same time.

12. In a shutter for controlling the passage of light through the optical system of a camera, the combination of a rotating disk lying in the path of the light passing through the system and having an aperture which passes through the optical axis of the system on each rotation of the disk, a second disk resiliently attached to said first disk and having an aperture which passes through the optical axis on each rotation thereof, the aperture in said second disk being displaced in the direction of rotation from the aperture in said first disk so that the apertures in the two disks pass through the optical axis at different times, means for restraining the rotation of said second disk so as to cause a change in its position relative to said first disk, and means operable in accordance with the movement of said first disk for actuating said restraining means at the proper moment to cause the apertures in the two disks to pass through the optical axis at the same time.

13. In a shutter for controlling the passage of light through the optical system of a camera, the combination of a rotating disk lying in the path of the light passing through the system and having an aperture which passes through the optical axis of the system on each rotation of the disk, a second disk resiliently attached to said first disk and having an aperture which passes through the optical axis on each rotation thereof, the aperture in said second disk being displaced in the direction of rotation from the aperture in said first disk so that the apertures in the two disks pass through the optical axis at different times, an electromagnet for imposing a drag on said second disk so as to cause a change in its position relative to said first disk, a driving member moving in synchronism with said first disk, a driven element selectively engageable with said driving member, and means controlled by said element in a predetermined position of said driving member for causing said electromagnet to be energized thereby changing the position of the second disk relative to the first to such an extent that the apertures in the two disks will both pass through the optical axis at the same time.

14. In a shutter for controlling the passage of light through the optical system of a camera, the combination of a rotating screen lying in the path of the light passing through the system and having an aperture which passes through the optical axis of the system in one direction on each rotation of the screen, a second rotating screen flexibly driven in phased relationship with respect to said first screen and having an aperture which passes through the optical axis in the opposite direction on each rotation thereof, the aperture in said second screen being so located as to pass through the optical axis at a time different from that at which the aperture in said first screen passes therethrough, and means operable in accordance with the movement of said first screen for changing the position of said second screen relative to said first screen so as to cause the apertures in the two screens to pass through the optical axis at the same time.

15. In a shutter for controlling the passage of light through the optical system of a camera, the combination of a constantly rotating disk lying in the path of the light passing through the system and having an aperture which passes through the optical axis of the system in one direction on each rotation of the disk, a second constantly rotating disk flexibly driven in phased relationship with respect to said first disk and having an aperture which passes through the optical axis in the opposite direction on each rotation thereof, the aperture in said second disk being so located as to pass through the optical axis ahead of the aperture in said first disk, means for restraining the rotation of said second disk so as to cause a change in its position relative to said first disk, and means operable by said first disk in a predetermined position thereof for rendering said restraining means effective at the proper moment to cause the apertures in the two disks to pass through the optical axis at the same time.

16. In a shutter for controlling the passage of light through the optical system of a camera, the combination of a power means for operating the shutter, a disk constantly rotated by said power means and lying in the path of the light passing through the system, said disk having an aperture which passes through the optical axis of the system on each rotation thereof, a second disk flexibly connected to said power means for rotation in phased relationship with respect to said first disk and having an aperture which passes through the optical axis in an opposite direction from that of said first disk, the aperture in said second disk being so located as to pass through the optical axis ahead of the aperture in said first disk, an electromagnet for imposing a drag on said second disk so as to reduce its speed of rotation, a driving member moving in synchronism with said first disk, a driven element selectively engageable with said driving member, and means controlled by said element in a predetermined position of said first disk for causing said electromagnet to be energized thereby reducing the speed of said second disk to such an extent that the aperture therein will pass through the optical axis at the time when the aperture in said first disk passes therethrough.

17. In a shutter for controlling the passage of light through the optical system of a camera, the combination of a screen lying in the path of the light passing through the system, means for imparting a constant speed of rotation to said screen, an aperture in said screen so located as to pass through the optical axis of the system on each rotation of said screen, a second screen lying in the path of the light passing through the system, means for rotating said second screen in phased relationship with respect to said first screen, an aperture in said second screen so located as to pass through the optical axis at a different time than the aperture in said first screen, and means operable in accordance with the movement of said first screen for so varying the speed of the rotating means for one of said screens as to cause the apertures in the two screens to pass through the optical axis at the same time.

18. In a shutter for controlling the passage of light through the optical system of a camera, the combination of a screen lying in the path of the light passing through the system, a constant-speed motor for rotating said screen with uniform speed, an aperture in said screen so located as to pass through the optical axis of the system on each rotation of said screen, a second screen lying in the path of the light passing through the system, a motor for rotating said second screen in phased relationship with respect to said first screen, an aperture in said second screen so located as to pass through the optical axis ahead of the aperture in said first screen, means for momentarily reducing the speed of the motor rotating said second screen, and means moving in synchronism with said first screen for so controlling said speed-reducing means as to cause the aperture in said second screen to pass through the optical axis at the time when the aperture in said first screen passes therethrough.

19. In a shutter for controlling the passage of light through the optical system of a camera, the combination of a disk lying in the path of the light passing through the system, a synchronous motor for rotating said disk with uniform speed, an aperture in said disk so located as to pass through the optical axis of the system on each rotation of said disk, a second disk lying in the path of the light passing through the system, a second synchronous motor for rotating said second disk in phased relationship with respect to said first disk, an aperture in said second disk so located as to pass through the optical axis ahead of the aperture in said first disk, a driving member moving in synchronism with said first disk, a driven element selectively engageable with said driving member, a set of inductances, and means operated by said element in a predetermined position of said first disk for switching said inductances into the line of said second motor whereby the speed of said second disk will be momentarily reduced and the aperture therein caused to pass through the optical axis at the time when the aperture in said first disk passes therethrough.

20. In a shutter for controlling the passage of light through the optical system of a camera, the combination of a first means for briefly and repeatedly uncovering the system for the passage of light therethrough, a second means for briefly and repeatedly uncovering the system for the passage of light therethrough but at a different time from said first means, and selectively operable means synchronized with the movement of said first means for causing said second means to uncover the system at the same time that it is uncovered by said first means.

21. The invention as defined in claim 4 wherein said disks are driven in opposite directions.

GEORGE A. MAGNUS.
SAMUEL ARONOFF.